United States Patent [19]

Holman

[11] 4,396,246

[45] Aug. 2, 1983

[54] INTEGRATED ELECTRO-OPTIC WAVE GUIDE MODULATOR

[75] Inventor: Robert L. Holman, Pittsford, N.Y.

[73] Assignee: Xerox Corporation, Stamford, Conn.

[21] Appl. No.: 193,244

[22] Filed: Oct. 2, 1980

[51] Int. Cl.³ .............................................. G02B 5/14
[52] U.S. Cl. .............................. 350/96.14; 350/96.13
[58] Field of Search ............... 350/96.13, 96.14, 96.17; 250/227

[56] References Cited

U.S. PATENT DOCUMENTS

| | | | |
|---|---|---|---|
| 3,695,745 | 10/1972 | Furukawa | 350/96.14 |
| 3,795,433 | 3/1974 | Chanin | 350/96.14 |
| 3,848,087 | 11/1974 | Carrell | 178/7.6 |
| 3,883,220 | 5/1975 | Taylor | 350/96.14 |
| 3,887,885 | 6/1975 | Hattori et al. | 332/7.51 |
| 3,904,270 | 9/1975 | Cheo | 350/96.15 |
| 3,923,373 | 12/1975 | Dabby | 350/96.14 |
| 3,924,931 | 12/1975 | Cheo | 350/160 R |
| 3,966,319 | 6/1976 | Lang | 355/66 |
| 3,974,506 | 8/1976 | Starkweather | 346/45 |
| 4,000,937 | 1/1977 | Kaminow | 350/96.14 |
| 4,047,795 | 9/1977 | Hughes et al. | 350/96 C |
| 4,048,591 | 9/1977 | Auracher | 332/7.51 |
| 4,056,304 | 11/1977 | Phillips | 350/96.14 |
| 4,073,675 | 2/1978 | Ballman et al. | 156/600 |
| 4,076,381 | 2/1978 | Hammer | 350/96.14 |
| 4,082,424 | 4/1978 | Sauter et al. | 350/96.13 |
| 4,100,408 | 7/1978 | Marshall | 250/230 |
| 4,111,521 | 9/1978 | Streifer et al. | 350/96.13 |
| 4,130,838 | 12/1978 | St. John | 358/267 |
| 4,142,775 | 3/1979 | Ramaswamy et al. | 350/96.14 |
| 4,146,297 | 3/1979 | Alferness et al. | 350/96.14 |
| 4,148,556 | 4/1979 | Sauter et al. | 350/96.13 |
| 4,166,669 | 9/1979 | Leonberger et al. | 350/96.13 |
| 4,168,107 | 9/1979 | Sauter | 350/96.13 |
| 4,172,630 | 10/1979 | Burns et al. | 350/96.12 |
| 4,213,157 | 7/1980 | De Benedictis | 358/293 |

FOREIGN PATENT DOCUMENTS 56-8112  1/1981  Japan .................. 350/96.14

OTHER PUBLICATIONS

Hammer et al., "Low Loss Single Mode Optical Waveguides", Applied Physics Letters, vol. 24, No. 11, Jun. 1974.

Primary Examiner—David K. Moore
Attorney, Agent, or Firm—Robert A. Chittum; Stephen J. Schultz

[57] ABSTRACT

An electro-optic wave guide substrate for both intensity modulating and continuously deflecting an incident laser beam. A first set of electrodes for intensity modulating the beam include substantially parallel, periodically interdigital conductors affixed to a substrate surface and coupled to a controlled voltage source. A second set of electrodes for beam deflecting have non-parallel conductors affixed to the same substrate and are also coupled to a controlled voltage. By controlling the voltage applied to the second set of electrodes the beam can be continuously deflected through a controlled angle to facet track a rapidly rotating multi-faceted mirror of a raster output scanner. The substrate is fabricated using a new technique whereby the atmosphere in which the waveguiding surface is diffused is controlled. In particular, the diffusion is done in a heated oxygen environment having an elevated moisture content. The elevated oxygen concentration tends to oxidize impurities in the substrate and the moisture tends to form lattice sites for trapping mobile charge carriers. Both effects reduce the incidence of optical damage in the wave guide caused by the laser beam.

10 Claims, 7 Drawing Figures

INTEGRATED ELECTRO-OPTIC WAVE GUIDE MODULATOR

BACKGROUND OF THE INVENTION

1. Field of the Invention

The present invention relates to electro-optic wave guides and more particularly to an electro-optic wave guide for both intensity/modulating and deflecting an incident light beam which might typically be a laser beam.

2. Prior Art

Scanning systems which utilize laser beams for transmitting information are known. U.S. Pat. No. 3,848,087, for example, entitled "Optical Scanner Control System" discloses a scanning system which utilizes a multifaceted mirror for deflecting a light beam over a scanning area. As successive mirror facets rotate into the path of an incident light beam the beam repetitively sweeps across the scanning area. Systems which utilize apparatus such as that disclosed in the '087 Patent have applications in both raster input scanning (RIS) and in raster output scanning (ROS). In raster input scanning, the light beam illuminates an original document line by line and enables the information contained in that document to be encoded through procedures known in the art.

For raster output scanning, the moving light beam may be used to encode information onto an information carrying media, such as a charged photoreceptor, a scanning system must encode information into the light beam and also must distribute that information across the photoreceptor. To accomplish the encoding of information prior art ROS systems typically intensity modulate the light beam at controlled intervals. As the beam scans the photoreceptor, the modulation dictates which areas will remain charged and which areas will discharge.

As raster output scanning has evolved certain refinements have been made in the encoding technique. One such refinement involves facet tracking of the intensity modulated beam. It should be appreciated that when a light beam is fixed and is caused to impinge upon a rotating mirror, the light beam traverses each facet of the multi-faceted mirror. Experience with prior art scanning systems indicates that the movement of the light beam across a facet of the mirror reduces the effectiveness of the scanning system. It is more efficient if the light beam follows or tracks a center of a particular facet as that facet moves in relation to the light beam. Consequently, errors introduced by inhomogeneity in the facet are largely eliminated. To provide this so called facet tracking the light beam must be deflected in space before it contacts the spinning mirror facet. These two ROS requirements of intensity modulating and deflecting are at present satisfied by bulk acousto-optic modulator devices. Such modulating devices are known in the art and are commercially available but are relatively costly and experience has shown that they are effective only over a limited optical wavelength.

To overcome these disadvantages in acousto-optic modulating devices, proposals have been made to utilize electro-optic modulators to replace the acousto-optic device. One such proposal is disclosed in U.S. Pat. No. 4,047,795 to Hughes et al. The Hughes et al. Patent recognizes the possibility of deflecting an incoming laser beam using an optical integrated circuit which includes control electrodes for deflecting the beam in a controlled manner. While addressing the deflection requirement of a conventional laser scanning system, the Hughes et al. patent does not deal with the intensity modulation requirement of a raster output scanning system. Indeed, applicant knows no raster scanning system which utilizes an integrated wave guide device for providing both intensity modulation and beam deflection on a single substrate. Thus, although in theory the Hughes et al. deflection technique could be combined with known methods of intensity modulating a laser beam, such a combination would require a separate beam modulator which would have to be optically coupled to the deflection device disclosed in the '795 Patent.

A further problem with use of an electro-optic wave guide crystal as an in-line device for ROS systems is the potential for optically damaging the wave guide by passing the high power laser beams required through its wave guide portion. Applicant knows of no prior art fabrication technique, for example, for producing an electro-optic wave guide having sufficient resistance to optical damage for extended time periods as required in a raster output scanning application.

SUMMARY OF THE INVENTION

The present invention comprises an electro-optic wave guide which provides substantial cost reductions and improved performance over prior art acousto-optic modulators. It has particular utility when used with a raster output scanner to facet track and thus to deflect an information encoded laser beam to a changed photoreceptor. The optical coupling techniques needed to practice the invention are simplified and require no optical coupling between beam deflection and beam intensity modulation devices.

According to the invention, a single electro-optic wave guide substrate operating in line with a laser light source confines light energy from the source and both intensity modulates and deflects the energy as it passes through. Electrodes coupled to the substrate and also coupled to controlled sources of electrical energy provide the modulation and deflection by changing the light transmission characteristics of the substrate. The deflection capabilities of the substrate are such that after the modulated light beam leaves the substrate it can be made to track and remain substantially coincident with the center of a moving facet of a multi-sided mirror. This capability can be used to enhance the functioning of the raster output scanner in a manner previously achieved with more expensive and less efficient acousto-optic coupling devices.

In a preferred embodiment of the invention, a first set of thin film electrodes for providing beam intensity modulation has substantially parallel and periodically interdigitated conductive segments which are coupled to opposite polarity sources of electrical energy. When an appropriate voltage is applied to the electrode, the substrate's extraordinary refractive index is periodically increased and decreased causing a fraction of the intensity of the laser beam transmitted to become diffracted in the plane of the substrate.

A second set of thin film electrodes on the same substrate surface as the first deflect the modulated beam continuously as a function of voltage to enable, for example, that beam to facet track a rotating mirror or other target. The second set has non-parallel surface conductive segments coupled to opposite polarity energy sources which can be controlled to modify the angle of beam deflection. Thus, for example, if the speed of rotation of a multi-facet mirror is known, the second set of electrode control voltages can be modified to cause the deflected beam to track each facet center until a subsequent facet rotates to a point where the light beam can be directed to its center.

According to another feature of the invention the entire electro-optic wave guide can be rotated 90° so that the beam would be deflected in a vertical rather than horizontal direction. In this application the beam deflection would be used to track the plane of the moving facets rather than track an individual facet face. Experience with prior art ROS systems indicate that the polygon mirror tends to wobble in its path and as a result the beam deflection also tends to wobble. By controllably deflecting the beam in accordance with the wobble the deflected beam path plane can be stabilized to provide more precise photoreceptor scanning.

The preferred wave guide substrate comprises a lithium niobate crystal having a thin wave guiding layer formed by controlled out diffusion of a chemical constituent of the lithium niobate. U.S. Pat. No. 4,071,396, for example, discloses a technique for out diffusing $Li_2O$ (lithium oxide) from a $Li Nb O_3$ (lithium niobate) crystal by maintaining the lithium niobate crystal in vapor phase equilibrium with a specially constructed crucible. Controlled out diffusion using the technique disclosed in the '396 Patent increases the refractive index of a thin surface layer thereby creating a wave guide.

A concern with prior art electro-optic wave guides is the incidence of optical damage caused by the optically coupled laser beam. The operational life of a lithium niobate wave guide is related to the degree to which it can resist optical damage since the development of optical damage increases the wave guides' insertion loss. To compete with a prior art acousto-optic modulate, for example, the electro-optic wave guide must have a mean time between failure of 40,000 hours.

To achieve this device lifetime, the lithium niobate wave guide should be constructed according to carefully controlled fabrication techniques, as discussed in a applicant's copending application Ser. No. 361,671, filed Mar. 25, 1982, a continuation-in-part application of application Ser. No. 193,248 filed Oct. 2, 1980, now abandoned.

As taught in the '396 Patent the transparent crystalline member such as lithium niobate (or lithium tantalate), is placed in a crucible having a cavity of predetermined dimensions such that the crystalline solid is substantially systmmetrically separated from the walls of the cavity. The crucible is made from a material which gives off the same chemical component in the vapor phase as the crystalline member at a controlled temperature. At this temperature, the concentration of the chemical component in its vapor phase has a vapor pressure less than about $10^{-4}$ atmospheres. The crucible and crystalline member are maintained at this temperature for a controlled time period sufficient to form a wave guiding region along a surface of the crystalline member.

In addition to these fabrication techniques, the out diffusion process is conducted under the most chemically oxidizing conditions possible. Both the crystalline member and the crucible should be free from carboneous matter so the crystalline member is supported in the crucible by an inert oxide. Where the crystalline member is lithium niobate, for example, it should be supported in the crucible on a lithium niobate support. It has also been observed that the heating should be in an oxidizing atmosphere (pure oxygen at 1 atmosphere, although higher pressures can be used to increase the oxidizing atmosphere) and the water vapor partial pressure should be increased. Water vapor is believed to act as a catalyst which increases the rate of oxidation. As the water vapor diffuses into the crystal the water vapor also acts as a source of additional electron trapping sites. To achieve the preferred fabrication environment the crucible and crystalline member are heated in an oven containing pure oxygen which has been moistened to elevate its humidity. Using these fabricating techniques, wave guides sufficiently resistant to optical damage at moderate laser intensities have been produced. When so fabricated the wave guides are comparable to prior art acousto-optic wave guides on a mean time between failure basis. When so fabricated, lithium tantalate wave guides damage as much as equivalent lithium niobate wave guides but at a laser power density more than thirty times lower.

The resistance to optical damage is increased by operating the wave guide at a controlled temperature above ambient. In addition to reducing optical damage such temperature control eliminates adverse effects on the wave guide caused by ambient temperature fluctuations normally occurring in a ROS environment. This temperature control is achieved in this integrated optic format by mounting the wave guide on a separate substrate of commercially available NESA glass having electrodes which are then energized to heat both the glass and the wave guide substrate.

From the above it should be appreciated the one object of the present invention is a capability to both intensity modulate and deflect a light beam, such as from a laser, by passing the beam through a single optical wave guide having controllable electrodes. Other features and objects of the present invention will be understood by reference to a detailed description of a preferred embodiment of the invention when considered with the accompanying drawings.

DETAILED DESCRIPTION OF THE PREFERRED EMBODIMENT

Figure 1:
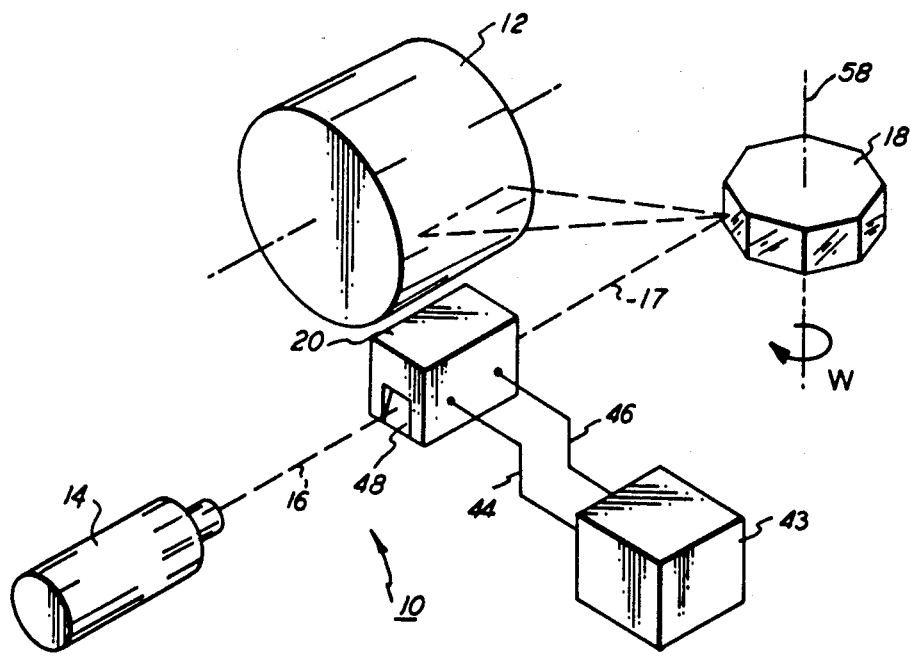
FIG. 1 is a schematic illustration of a raster output scanner having a beam modulator.

Turning now to the drawings, FIG. 1 shows an exemplary raster output scanning (ROS) system 10 which may, for example, be incorporated in an electrostatic copier for encoding a photoreceptor 12 or the like with information. One such scanning system is disclosed in U.S. Pat. No. 3,848,087 entitled "Optical Scanner Control System". The system 10 has a source 14 of moderate intensity light such as a He-Ne laser (2-8 m watts or more). A beam 16 of light generated by light source 14 is modulated and deflected by the modulator 20 of the present invention to encode the photoreceptor 12 with information as will appear.

Prior to being scanned by the light beam 17 the photoreceptor 12 is uniformly charged across its width by a charging device (not shown) and is rotated to a imaging station where a modulated light beam 17 scans the photoreceptor to encode information onto its surface. Those portions of the photoreceptor 12 which are contacted by the light beam 17 are discharged and those portions of the photoreceptor which are not contacted by the light 17 remained charged. Once the photoreceptor is encoded with information (line by line) that information may be developed and thereafter transferred to a copy sheet by techniques known in the xerographic art.

The system 10 includes a rotating multi-faceted mirror 18 which intercepts the modulated beam 17 output by modulator 20. The mirror rotation causes the beam to scan across the surface of photoreceptor 12 as the angle of incidence between the beam and the mirror facet changes. As will appear, the modulating device 20 intercepts the beam 16 from source 14 and both intensity modulates and continuously controls the light beam deflection, the latter assuring that the output beam 17 to be directed to the center of a particular facet on the the multi-faceted mirror 18 whatever the incident angle between beam 17 and mirror 18. By enabling the amount of deflection to be continuously changed, modulator 20 permits the beam to be centered on each mirror facet as the mirror rotates. The deflection angle depends on the distance between the modulator 20 and the mirror 18. Generally, a small deflection angle is required (1-10 mRad). The more critical specification is that the modulator 20 form two resolvable spots. Once the modulated beam completely sweeps across the photoreceptor 12, the beam is allowed to "flyback" to a beginning point to track the center of the next mirror facet in its rotational path.

Figure 2:
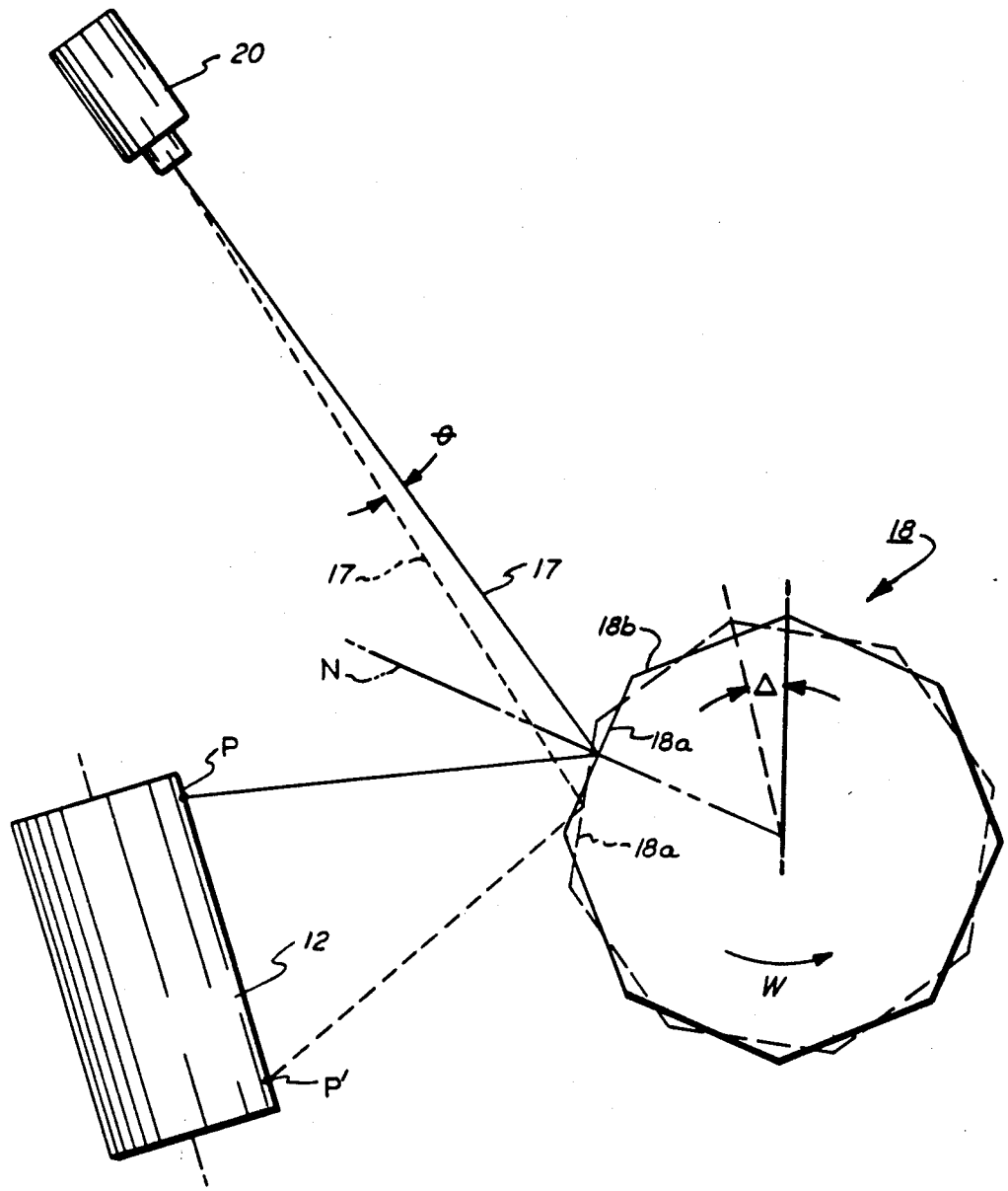
FIG. 2 is a schematic plan view of a rotating multi-faceted mirror showing how each facet center is tracked through use of the present invention.

FIG. 2 further illustrates the facet tracking of the polygon mirror 18. At an initial position the modulated beam 17 contacts a facet 18a at approximately its center and is reflected to a point P on the photoreceptor 12. As the mirror 18 rotates the angle of incidence the beam 17 makes with the facet 18a changes to cause the beam to sweep across the photoreceptor 12. At a later point in time, the mirror 18 has rotated through an angle such that the beam 17 now strikes the photoreceptor 12 at a point P'. To cause the beam 17 to track the center of the facet 18a the beam 17 is deflected through an angle θ. As the mirror 18 continues to rotate a next facet 18b rotates into a position where the beam 17 can be directed to the center of that next facet 18b. To do so, however, it should be appreciated that the beam 17 must flyback to its initial position as shown in solid line in FIG. 2.

Figure 3:
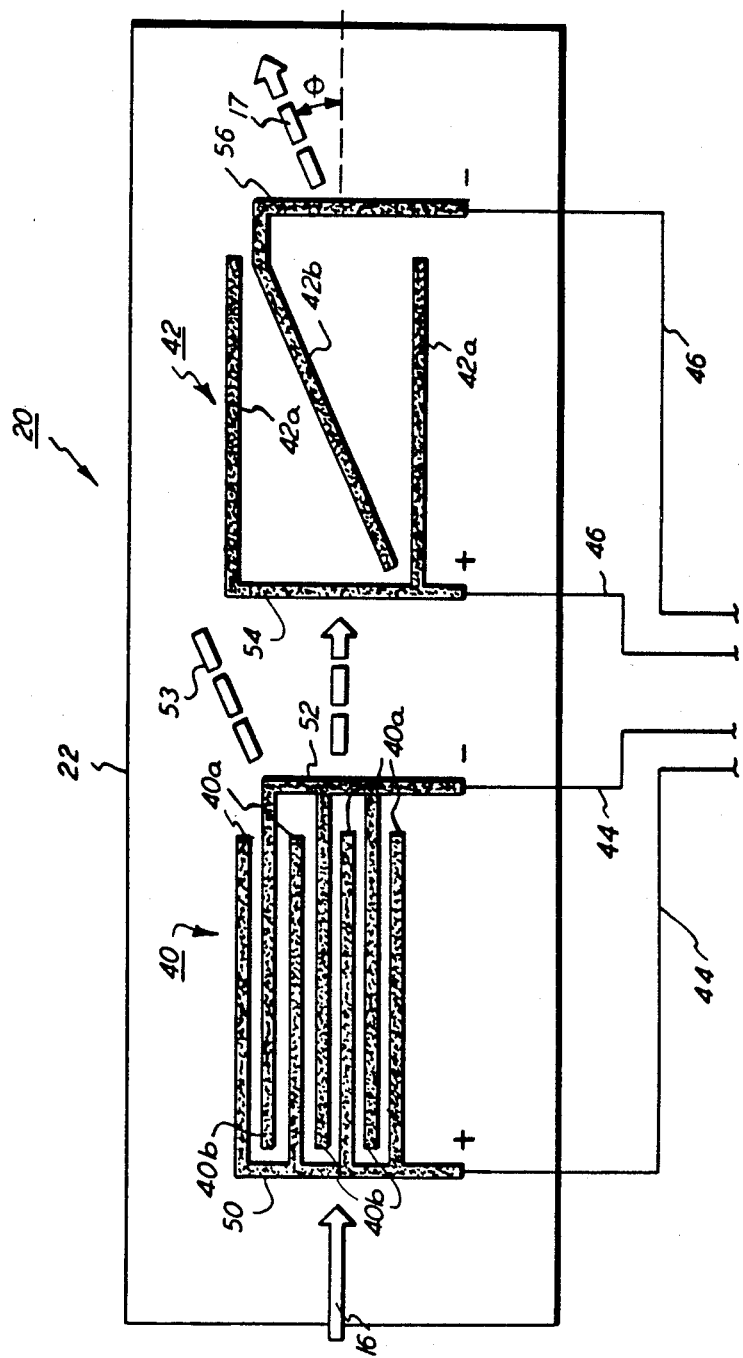
FIG. 3 is a schematic plan view of the modulator showing two control electrode configurations.

The modulator 20 comprises an electro-optic wave guide formed from a single substrate 22 (FIG. 3). In the preferred embodiment of the invention the substrate material comprises lithium niobate. Techniques for producing lithium niobate (or tantalate) wave guide devices are known and one such technique is disclosed in U.S. Pat. No. 4,071,396 entitled "Controlled Atmosphere Process for Altering the Non-stoichiometry of Crystalline Member" which has been assigned to the assignee of the present invention. That application is also incorporated herein by reference. According to the technique disclosed in that application, optical polished lithium niobate wafers which are commercially available are cleaned and batch heat treated in a special furnace or oven.

Figure 5:
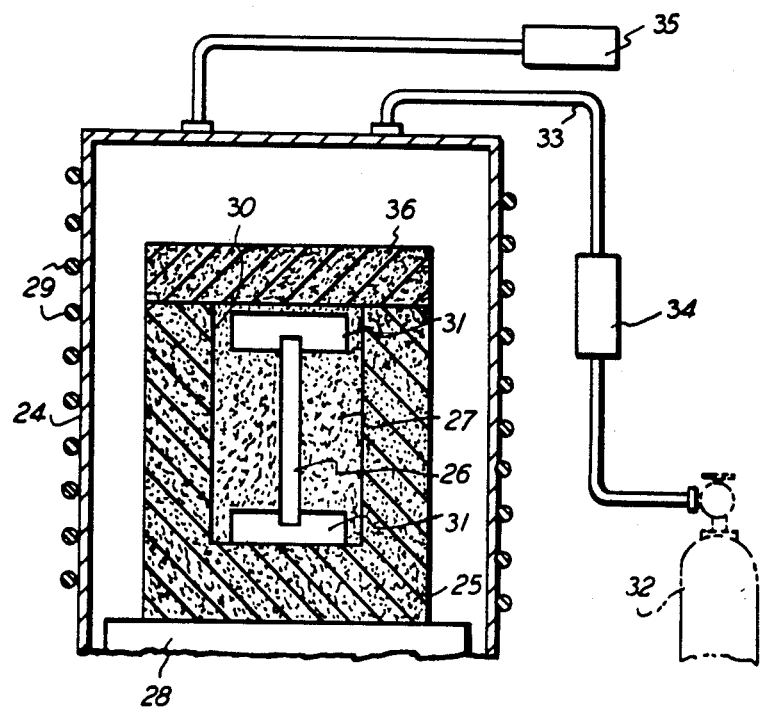
FIG. 5 is a schematic showing apparatus for producing a wave guide substrate to which the electrode configuration is affixed.

FIG. 5 illustrates one such oven 24 surrounding a crucible 25 which supports a crystalline member 26 such as lithium niobate. The crucible 25 comprises a material having a vapor phase in common with the crystalline member 26 as represented by the dots 27. The crucible 25 sits on a pedestal 28 so that the pedestal 28 and crucible 25 can be place inside the oven 24 and heated with heating elements 29 which surround the oven's exterior.

The crucible 25 is preferably composed of two or more homogeneously mixed equilibrium phases. For example, $LiNbO_3$ and $LiNb_3O_8$ comprise such a combination if the mole fractions of $Li_2O$ and $Nb_2O_5$ are 0.40 and 0.60 respectively. This example is illustrative and as taught in the '396 Patent other percent concentrations could be used in fabricating the crucible including the usage of pure $LiNb_3O_8$. Choice of the mixture needed to create a proper atmosphere for outdiffusion of the lithium niobate is determined empirically. About 20% by volume of finely crushed napthalene crystals are added to act as a binder and porosity control. Once a crucible structure is formed, the naphthalene is burned out slowly by heating the crucible for 12 hours at 250° C. Finally the crucible is calcined in air (or oxygen) for 12 hours at 1000° C., then for >100 hours at 1100° C.

The crystalline member 26 is supported in a cavity or slot 30 defined by the crucible. The slot has physical dimensions such that the spacing between its interior walls and the crystalline member 26 is sufficiently small to produce mass transport under equilibrium conditions. One to three millimeters is satisfactory for the crucible materials listed above.

The crystalline member 26 is held in place by top and bottom supports 31 comprising an inert oxide, such as lithium niobate. It has been found that other materials, such as platinium, which were used to support prior art substrates tend to promote reduction and therefore reduce the substrate's resistance to optical damage.

Optical damage refers to a localized variation of the substrate's refractive index brought about electrooptically, by a laser-induced separation of charge, occurring along an axis transverse to the laser beam direction of propagation. The mechanism responsible for a directional displacement of electrons within the substrate has not been established convincingly but it is generally believed to be associated with the lithium niobate's ferroelectric asymmetry.

The charge separation producing electrons are photogenerated predominately from $Fe^{+2}$ substitutional lattice sites lying about 2.6 eV below the conduction band. They are trapped at a lattice site (presumably oxygen vacancies) with an activation energy of about 1.1 eV. The resulting spacecharge fields persist for a time duration which depends upon the dark resistivity of the crystal (months at room temperature, seconds at 150° C.). When such refractive index damage is induced in a bulk crystal, two effects occur simultaneously. The birefringence of the crystal changes locally, causing the wave front of the laser beam to become distorted. The induced birefringence is a function of position in the crystal and its magnitude saturates in time. Wave front distortion is caused by the gradient in birefringence, which in turn, causes a de-focussing of the laser beam. On the other hand, when such refractive index damage is induced in a wave guide, it reduces (and eventually distorts) the wave guide's gaussian output beam intensity by asymmetrically deflecting or scattering light within the plane of the wave guide. When damage occurs at a modest level, power is scattered away from the direction of propagation. The induced scattering builds up gradually and without an apparent threshold, to a saturation value determined by the laser's power density. The development of optical damage is more severe at shorter laser wavelengths, higher laser power densities, and in wave guides formed with increased concentration of photoionizable donor impurities.

The degree of optical damage in crystals has been correlated with the net number of donor electrons available for displacement, while the rate with which the damage builds up, is believed to be influenced by the effective number of electron trapping states and their activation energy. Increased electron trapping can reduce the electron mobility, reducing the rate of electric field buildup, and thereby reducing the rate of optical damage. When the concentration of electron donor impurities ($Fe^{+2}$) can be reduced through oxidation, the concentration of laser displaced electrons can be reduced.

To both increase the oxidation of substrate impurities and increase electron trappings the oven 24 is filled with moist oxygen rather than air. An oxygen source 32 supplies oxygen to the oven interior through a conduit 33 which includes a humidifier 34. By controlling the oxygen pressure and humidity, a reduction in impurities through oxidation of $Fe^{+2}$ iron to $Fe^{+3}$ iron oxide and an increase in electron trapping sites is achieved.

The control over the humidity was believed to be important since a correlation was found between optical damage and the concentration of $OH^-$ ions in bulk crystals of lithium niobate heated in the presence of an applied electric field. In the present case the wave guide is prepared in a moist environment without an electric field and the improvement in performance is attributed to the catalytic effect HOH has in increasing the speed with which the system reaches equilibrium with the highly oxidizing atmosphere provided by the diffusion crucible 25 and the pure oxygen inside the oven 24. In addition, further improvement is related to the replacement of oxygen ions by hydroxy ($OH^-$) ions in the substrate's crystal lattice. This replacement increases the crystal's electron trapping cross section, thus inhibiting the development of optical damage. A preferred oven would contain essentially pure oxygen having a relative humidity of over 50%. To achieve this controlled environment the oven is first evacuated to a low pressure by a vacuum pump 35 and then pressured with humid oxygen from the source 32.

Since the crucible is porous, the heated, moist oxygen flows through it to the substrate 26. To enhance temperature uniformity within the cavity 30 a cap 36 comprising the same compounds from which the crucible is made is placed over the crucible cavity 30.

Wave guiding properties are exhibited by lithium niobate crystals when heated in the oven 24 at 1100° C. for 0.1, 0.2, 0.4, 1, 4, 16 and 24 hours. By such heating a nonstoichiometric condition is created at the surface of the crystalline member 26. Increased heating times increases the depth inside the crystal to which this nonstoichmetric condition diffuses.

Once the lithium niobate substrate has been processed to include a wave guiding layer to confine the laser beam path of travel in a well defined region 38 (FIG. 4) of the substrate the beam can be intensity modulated and directed by two sets of electrodes, 40, 42 (FIG. 3). These electrodes are positioned along the confined path of beam travel and are coupled to a control module 43 by conductors 44, 46 as shown in FIG. 1.

Figure 4:
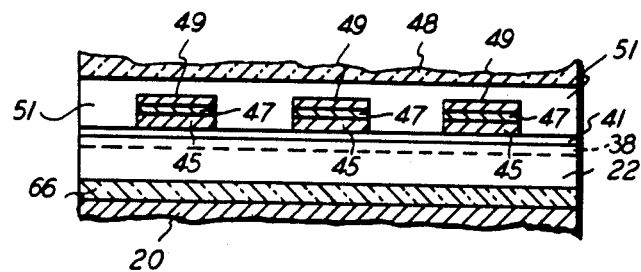
FIG. 4 is a cross sectioned view showing the electrode fabrication design.

To fabricate the electrodes 40, 42, the surface of the lithium niobate wave guide substrate 22 is covered with some suitable dielectric such as titanium dioxide or silicon dioxide 41 using vacuum deposition techniques known in the art to provide optical isolation between the wave guide region 38 and the electrodes 40, 42. The presence of the titanium dioxide or silicon dioxide 41 reduces the wave guide's insertion loss without seriously reducing the magnitude of the electromagnetic fields which penetrate the wave guide 38 in response to controlled energization of the electrodes 40, 42. After the titanium dioxide or silicon dioxide is applied to the wave guide, successive layers of chromium 45, gold 47, and chromium 49 are applied to form the electrode patterns illustrated in FIGS. 3 and 4. The first chromium layer 45 acts as an adhesion inhibitor between the silicon dioxide and the gold 47, and the second chromium layer 49 performs a similar function between the gold 47 and an upper silicon dioxide region 51. As will be discussed, the geometrical configuration of electrodes 40, 42 is important in achieving combined intensity and deflection modulation on a single substrate. Finally, a layer of magnesium fluoride or silicon dioxide 51 is placed over the electrodes to protect them and to allow optical coupling of the substrate to the laser through a prism 48 (FIG. 4).

Referring to FIG. 3, the first set 40 of electrodes, as known in the art, is used to modulate the beam 16 and comprises a set of parallel and periodically interdigitated electrode segments 40a, 40b. The segments 40a are connected to a first perpendicularly oriented bus segment 50 while alternate segments 40b are connected to a second perpendicularly oriented bus segment 52. Segments 50, 52 are, in turn, coupled to one set of conductors 44.

Application of an appropriate voltage to segments 40a, 40b creates an electrically controllable phase grating in the substrate structure. With the disclosed electrode arrangement, it has been found that a constant direct voltage potential (D.C.) can be applied across the electrode segments 50, 52 when the beam is to be turned off. Alternately, a bipolar square wave symmetric about ground can be applied to the perpendicularly oriented segments 50, 52. Either energization technique achieves intensity modulation by controlled diffracting of the incoming laser beam. This diffraction is achieved alternately and periodically by lowering and raising the refractive index of the niobate substrate via the electrooptic effect. As a result, light is diverted away from the lower index of refraction region to adjacent side bands 53 whose orientation depends on the electrode geometry. By controlled application of either the D.C. or square wave signal to the first electrode set 40, information can be encoded onto the laser beam. Use of bipolar drive is preferred with lithium niobate to prevent field assisted laser induced degrading effects from occurring.

With regard to beam modulation using controlled diffraction, it should be appreciated that the difracted beam could be transmitted through the wave guide to the photoreceptor and the non-diffracted beam could have an angle of incidence such that it would never exit the wave guide. Application of a controlled D.C. or bipolar signal in this configuration would refract the beam away from its incident path to a direction which would allow the second electrode set 42 to control beam transmittal to the mirror 18.

The second electrode set 42 is used to control deflection of the modulated beam from the first electrode set 40. Energization of the second electrode set 42 causes the modulated zero order laser beam to be deflected continuously back and forth within the plane of the wave guide in order to cause the beam 17 to facet-track the center of successive facets of the polygon mirror 18 as it rotates. The second electrode set is composed of a first segment having opposed parallel electrodes 42a and a second segment having an electrode 42b extending between electrodes 42a and at an angle with respect thereto.

Figure 6:
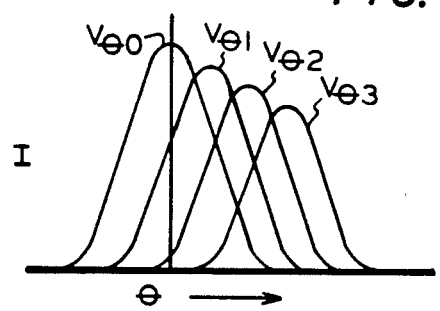
FIG. 6 shows the deflected beam intensity (I) as a function of deflection angle $\theta$ for various applied voltages for one of the FIG. 3 electrodes.

The second electrode set is energized by a direct current voltage difference applied to electrodes 42a, 42b through two bus portions 54, 56. As the modulated beam output by the first electrode set passes beneath the energized second electrode set the beam is deflected in proportion to the magnitude of voltage applied across the electrode 42a, 42b. FIG. 6 shows beam intensity (I) as a function of deflection angle $\theta$ for various applied voltages $V_{\theta 0}$, $V_{\theta 1}$, $V_{\theta 2}$, etc. when $V_{\theta 0}=0$ volts and $V_{\theta 1}$ etc. are incriments of voltages applied to the electrodes 42a, 42b. By coordinating changes in the input voltage to the second electrode set with the rotation of the multi-faceted mirror 18, the laser beam is deflected to track the center of successive facets on the multi-faceted mirror 18.

For example, application across the two electrodes 42a, 42b of a sawtooth wave form centered about ground causes the modulated beam to continuously sweep through an angle of $\theta$ (FIG. 2) as the wave form sweeps from its maximum negative to maximum positive value. By coordinating the sawtooth wave form with rotation of the mirror 18, the modulated beam is caused to track the center of successive mirror facets as they rotate about the mirror axis of rotation 58. In this example, the frequency of the sawtooth wave form must be Nw, where N is the number of facets on the mirror and where w is the angular mirror speed in rotation per time period.

The disclosed intensity modulator and beam deflector electrode sets can be applied to a single substrate as small as 15 mm × 3 mm × 0.075 mm or smaller. Application of a 25-50 volt potential difference to the second electrode set can result in a beam deflection as large as 5 m Rad in two resolvable spots which is adequate for continuously scanning a polygon mirror of conventional ROS systems.

As an alternative embodiment of the invention the substrate 22 can be rotated 90° about an axis coincident with the incident laser beam 16 to perform the raster output scanning in a slightly different manner. When so rotated, the second set of electrodes 42 will vertically rather than horizontally deflect the beam transmitted by the substrate. This capability allows the modulated beam to scan a mirror 18 which wobbles about the axis of rotation 58. In this mode of operation, the laser beam is no longer centered in a facet but instead scans the mirror 18 to maintain scan line position across the photoreceptor as vibration or wobble change the incident angle with which the modulated mirror strikes the mirror.

Figure 7:
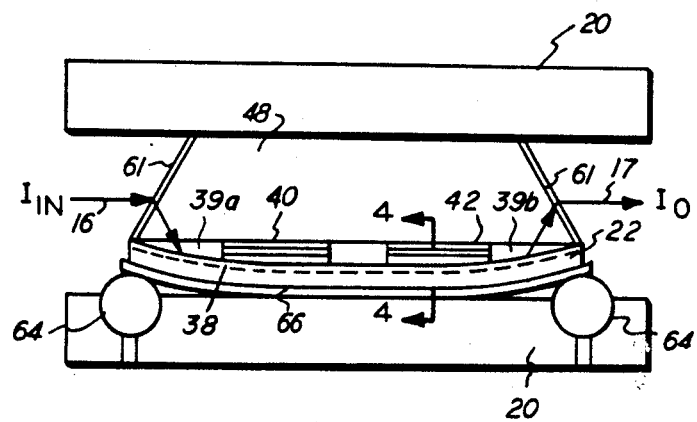
FIG. 7 is a schematic elevation view of the modulator showing a beam input and output coupling technique.

FIG. 7 shows an improved optical coupling technique for the present invention. An input beam 16 in from the source 14 is directed to an angled surface of a truncated rod-like prism 48. The incident beam is refracted by the prism, crosses a tapered air gap 39a and enters the wave guide portion 38 of the modulating device 20 and is transmitted through the wave guide along a path directly beneath the electrode sets 40, 42. The now modulated and deflected modulated beam 17 exits the lithium niobate substrate 22, crosses a second air gap 39b, passes through a portion of the prism 48 and once again is refracted by the prism/air interface toward the multi-faceted mirror 18. Optical coupling techniques for a beam entering and exiting a prism, such as that illustrated in FIG. 7 are known and in particular details of that optical coupling are available through reference to an article co-authored by applicant entitled "A Very High Throughput Damage Resistant Lithium Niobate Wave Guide Modulator", Topical Meeting on Integrated and Guided Wave Optics, Technical Digest Tu E6-1, January, 1980. That article is incorporated herein by reference. The prism 48 is formed with 52.5° face angles so that the input beam 16 is directed in line with the prism's base. The input and output faces 61 are coated with layers of magnesium fluoride (or silicon dioxide) of a thickness to cut the reflectivity of those faces to less than one percent. The prism 48 and wave guide with the electrodes 40, 42 attached are combined in the modulator 20. The modulator 20 further comprises two 0.125" diameter stainless steel balls 64 spaced 12-16 mm apart and aligned with the centerline of the electrodes 40, 42. The height of the balls 64 is adjusted to deflect the substrate 22 against the prism 48 thereby forming aligned input and output coupling regions.

Other optical coupling techniques are known and could be utilized for optically coupling an input laser beam to the lithium niobate substrate 22. Other such alternative techniques employ direct coupling to the wave guide's end-fire, or utilizing an input grating or optical fiber input.

Interposed between the substrate 22 and the stainless steel balls 64 is a glass slide 66 which protects the substrate 22 from damage by the steel balls 64. The slide 66 can be made of conventional glass or alternatively may comprise a NESA (registered trademark) glass material commercially available from the Corning Glass Company with two electrodes for electrical energization. For a NESA slide with dimensions of 4 mm × 20 mm × 1 mm application of 800 mw of electric power (not shown) to the slide 66 raises its surface temperature to 150° C. If the modulator 20 has insulating walls the power requirements to maintain the substrate 22 at an elevated temperature are reduced. By operating the modulators 20 at elevated temperatures the incidence of optical damage is reduced and the device's performance will be unaffected by changes in the ambient temperature of the scanning system. This last feature is important if the optics are to be aligned properly and to remain aligned during scanning as ambient temperture fluctuations occur greater than about ±0.5° C.

To use the present invention for Raster Input Scanning (RIS) the controlled intensity modulation is no longer necessary. The incident beam 16 can be directed to the second electrode set 42 unmodulated and that second set 42 can be controlled to facet track the rotating mirror 18.

While a preferred embodiment of the present invention has been described with a degree of particularity, certain design modifications or changes could be made in the system and, in particular, the control voltages and control circuitry coupled to the electrodes could be generated in a a number of different ways. Thus, it is intended that all modifications or alternatives falling within the spirit or scope of the appended claims be covered by the present invention.

What is claimed is:

1. An integrated electro-optic wave guide modulator for use in a raster output scanning system having a rotating multi-faceted mirror comprising:
   (a) an optical wave guide formed in a region adjacent one surface of a substrate for substantially confining light energy propagation therealong;
   (b) means for receiving a coherent light beam by an entrance portion of said wave guide;
   (c) a first set of interdigital electrodes affixed adjacent a first portion of said wave guide which first set of electrodes create an electrically controllable phase grating in the wave guide when a signal voltage potential is supplied between adjacent electrodes in said first set, thereby diffracting the light beam and thus achieving intensity modulation as a means for encoding information into the light beam;
   (d) a second set of interdigital electrodes affixed adjacent a second portion of said wave guide and downstream from the first set, the second set of electrodes being for controllably deflecting the intensity modulated light beam when a varying voltage potential is supplied across adjacent electrodes of the second set;
   (e) means for supplying the signal voltage potential to the first set of electrodes;
   (f) means for supplying the varying voltage potential to the second set of electrodes; and
   (g) means for decoupling the intensity modulated and deflected light beam from the wave guide.

2. The modulator of claim 1 wherein the first and second sets electrodes are separated from said wave guide by a suitable dielectric material such as titanium dioxide or silicon dioxide to provide optical isolation between the wave guide and the first and second sets of electrodes and to reduce the wave guide's insertion loss; and
   a suitable dielectric material such as magnesium fluoride or silicon dioxide is used for a spacer between the first and second sets of electrodes and the prism and for protection of the electrodes.

3. The modulator of claim 2 wherein said first and second sets of electrodes comprise a gold conductor bounded by chromium layers, the chromium layers acting as an adhesion inhibitor between the gold and the dielectric materials providing optical isolation of the wave guide and electrode protection.

4. The modulator of claim 1, wherein the substrate comprises a lithium niobate material and the region of the substrate forming the wave guide is defined by out-diffusion of the lithium niobate in an atmosphere of moist oxygen which increases oxidation of substrate impurities and increases electron trappings, thereby reducing the rate of optical damage to the wave guide.

5. The modulator of claim 1, wherein said means for receiving a coherent light beam by the wave guide and said means for decoupling the intensity modulated and deflected light beam from the wave guide is a single truncated prism in combination with preselected distances of air spaces between said prism and said wave guide; said prism having input and out surfaces for refracting said beam, the input prism surface receiving said beam and directing it out of the prism, through said preselected first air space and into one end of the wave guide and the output prism surface for directing the intensity modulated and deflected light beam received from the other end of the wave guide through a second air space and through said prism towards the center of successive ones of the moving facets of the rotating multi-faceted mirror; and
   means for adjusting the spacing between said prism and said wave guide to achieve said preselected distances of the first and second air spaces and for positioning the wave guide for proper orientation with respect to said beam so that said beam enters and exits from said wave guide at the desired location.

6. The modulator of claim 5 which further comprises a heatable glass sheet interposed between said substrate and said means for adjusting to protect the substrate from damage by said means for adjusting; and heating electrodes affixed to the glass sheet, the heating electrodes being connected to a controllable electrical energy source for maintaining the modulator at a predetermined operating temperature.

7. The modulator of claim 6 wherein said glass sheet comprises NESA glass.

8. The modulator of claim 6 wherein the heating electrodes maintain the operating temperature range above ambient temperature to about 150° C. in order to increase further the resistance to optical damage of the wave guide and to eliminate adverse effects on the wave guide caused by ambient temperature fluctuations normally occurring in a typical raster output scanning environment.

9. In a raster output scanner utilizing a laser generated light beam and a multi-faceted rotating beam deflector for sweeping lines of information across an image retention member to generate images thereon, an integrated electrode-optic modulator interposed between the beam an the deflector for first encoding information in said beam and second for directing and maintaining said beam to the center of each successive facet of the deflector as the deflector rotates comprising:
   an electro-optic wave guide in a substrate having a means for receiving the laser beam and an output means for transmitting said beam to the multi-faceted rotating beam deflector;
   a first beam controlling means having substantially parallel and periodically interdigitated surface electrodes coupled to opposite polarity sources of electrical energy, the electrodes being affixed to said substrate at a first location for intensity modulation of said beam as it passes through a first segment of the wave guide for the purpose of encoding information into said beam; and
   a second beam controlling means having a number of non-parallel surface electrodes coupled to opposite polarity sources of electrical energy affixed to said substrate at a second location for sweeping said intensity modulated beam back and forth across said output means for the purpose of directing and maintaining said modulated beam substantially centered on a one of the moving facets for a controlled time as said deflector rotates to enhance the effectiveness of the scanner and to remove errors introduced by inhomogeneity of the facets.

10. The modulator of claim 9, wherein means for controlling the operating temperature of the modulator is provided to maintain the operating temperature range above ambient to around 150° C. in order to reduce optical damage to the wave guide and to maintain proper alignment of the optical path during fluctuation of ambient temperature in the operating environment of the raster output scanning system.

* * * * *